(12) United States Patent
Zhu et al.

(10) Patent No.: US 10,991,068 B2
(45) Date of Patent: Apr. 27, 2021

(54) PROJECTION IMAGE CONSTRUCTION METHOD AND DEVICE

(71) Applicant: Beijing Qiyi Century Science & Technology Co., Ltd., Beijing (CN)

(72) Inventors: Jiadan Zhu, Beijing (CN); Tao Wang, Beijing (CN); Hongbin Liu, Beijing (CN)

(73) Assignee: BEIJING QIYI CENTURY SCIENCE & TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/311,649

(22) PCT Filed: Aug. 30, 2017

(86) PCT No.: PCT/CN2017/099686
§ 371 (c)(1),
(2) Date: Dec. 19, 2018

(87) PCT Pub. No.: WO2018/113339
PCT Pub. Date: Jun. 28, 2018

(65) Prior Publication Data
US 2019/0340726 A1 Nov. 7, 2019

(30) Foreign Application Priority Data

Dec. 20, 2016 (CN) .......................... 201611187138.2

(51) Int. Cl.
*G06K 9/00* (2006.01)
*G06T 3/00* (2006.01)

(52) U.S. Cl.
CPC .................................. *G06T 3/0062* (2013.01)

(58) Field of Classification Search
CPC ....... H04N 19/00024; H04N 19/00139; H04N 19/00315; H04N 19/00448;
(Continued)

(56) References Cited

U.S. PATENT DOCUMENTS 6,480,229 B1  11/2002  Driscoll, Jr. et al.
9,019,341 B2 *  4/2015  Kweon ............. H01L 27/14625
348/36
(Continued)

FOREIGN PATENT DOCUMENTS

CN      1707354 A    12/2005
CN    101639621 A     2/2010
(Continued)

OTHER PUBLICATIONS

Extended Search Report for European Application No. 17884562.4 dated Nov. 13, 2019; 11 pgs.
(Continued)

*Primary Examiner* — Duy M Dang
(74) *Attorney, Agent, or Firm* — Umberg Zipser LLP (57) ABSTRACT

The present application provides a method and device for constructing a projection image. The method for constructing a projection image comprises: performing projection on an equirectangular panoramic image with a cylindrical surface equal-area projection model to obtain a cylindrical surface equal-area projection image; obtaining a two-dimensional coordinate of each of pixels in the cylindrical surface equal-area projection image; obtaining a two-dimensional coordinate in the equirectangular panoramic image corresponding to each of pixels in the cylindrical surface equal-area projection image; performing pixel interpolation on the cylindrical surface equal-area projection image based on color information of each of pixels in the equirectangular panoramic image and the obtained two-dimensional coordinate in the equirectangular panoramic image corresponding to each of pixels in the cylindrical surface equal-area projection image to generate a panoramic image subjected to the cylindrical surface equal-area projection transformation.

(Continued)

The resolution and bit rate of the panoramic image or video can be reduced by the method of the present application.

12 Claims, 3 Drawing Sheets

(58) Field of Classification Search
CPC .......... H04N 1/40012; H04N 1/40018; H04N 1/40025; H04N 1/40031; H04N 1/40037; H04N 1/40043; H04N 1/4005; H04N 1/40056; H04N 1/40062; H04N 1/40068; H04N 1/40075; G06T 3/0062; G06T 3/40; G06T 3/4007; G06T 2207/20; G06T 3/00; G06T 3/0018; G06T 3/0031; G06T 3/0006

See application file for complete search history.

(56) References Cited

U.S. PATENT DOCUMENTS

| | | | |
|---|---|---|---|
| 2002/0041326 | A1 | 4/2002 | Driscoll et al. |
| 2008/0074500 | A1 | 3/2008 | Chen et al. |
| 2017/0302714 | A1* | 10/2017 | Ramsay ................ H04L 65/601 |
| 2019/0385277 | A1* | 12/2019 | Hutchinson ........... G06T 3/0062 |
| 2020/0193676 | A1* | 6/2020 | Shih ....................... H04N 19/86 |
| 2020/0221067 | A1* | 7/2020 | Abbas .................... H04N 19/44 |

FOREIGN PATENT DOCUMENTS

| | | |
|---|---|---|
| CN | 102831626 A | 12/2012 |
| CN | 103617606 A | 3/2014 |
| CN | 104392201 A | 3/2015 |
| CN | 105550984 A | 5/2016 |
| CN | 105933707 A | 9/2016 |
| CN | 106056531 A | 10/2016 |
| CN | 106127681 A | 11/2016 |
| CN | 106780310 A | 5/2017 |
| JP | 2006309802 A | 11/2006 |
| JP | 2014134856 A | 7/2014 |
| KR | 20090012290 A | 2/2009 |
| TW | 358189 B | 5/1999 |
| TW | 413796 B | 12/2000 |

OTHER PUBLICATIONS

First Examination Report issued for Australian Patent Application No. 2017383979 dated Nov. 25, 2019; 5 pgs.

He, Y. et al., "AHG8: InterDigital's projection format conversion tool," JVET-D0021 Document, Joint Video Exploration Team (JVET), 4th Meeting, Chengdu, CN, Oct. 2016 <URL: http://phenix.int-evry.fr/jvet/doc_end_user/documents/4_Chengdu/wg11/JVET-D0021-v4.zip>; 12 pgs.

He. Y., et al., "AHG8: InterDigital's projection format conversion tool," JVET-D0021 Presentation, Joint Video Exploration Team (JVET), 4th Meeting, Chengdu, CN, Oct. 2016 <URL: http://phenix.int-evry.fr/jvet/doc_end_user/documents/4_Chengdu/wg11/JVET-D0021-v4.zip>; 16 pgs.

International Search Report for International Application No. PCT/CN2017/099686 dated Nov. 30, 2017, English Translation included; 4 pgs.

Meng, Junzhen, "Application of Kriging Interpolation Approximate Grid Algorithm in Raster Data Projection Transformation," Basic Science Edition of China Master's Theses Full-Text Database, published Apr. 15, 2010; 72 pgs.

Second Office Action of priority Chinese Application No. 201611187138.2 dated Oct. 30, 2019; 6 pgs.

Wang, et al., "EL512—Image Processing: Geometric Transformations: Warping, Registration, Morphing (partly based on A. K. Jain Fundamentals of Digital Image Processing")", May 14, 2014; 48 pgs. Retrieved from the Internet Oct. 30, 2019: URL:https://web.archive.org/web/20140514093425/http://eeweb.poly.edu/~yao/EL5123/lecture12_ImageWarping.pdf.

Wikipedia, "Lambert cylindrical equal-area projection," published Nov. 30, 2016 (archived version), <URL: https://en.wikipedia.org/w/index.php?title=Lambert_cylindrical_equal-area_projection&oldid=752326723>; 5 pgs.

An Application of the Kriging Interpolation Approximate Grid Algorithm in the Raster Data Projection Transformation.

First Office Action for Korean Application No. 10-2019-7002235 dated Feb. 19, 2020; 5 pgs.

He et al., "AHG8: InterDigital's projection format conversion tool," Joint Video Exploration Team (JVET) of ITU-T SG 16 WP 3 and ISO/IEC JTC 1/SC 29/WG 11, Document: JVET-D0021, 4th Meeting: Chengdu, CN Oct. 15-21, 2016, updated Feb. 19, 2020; 19 pgs.

Office Action for Japanese Patent Application No. 2019-533268 dated Jun. 9, 2020; 2 pgs.

English translation of Kazuki Wakasa's article ("Proposal of a Method for Measuring the Ratio of Visible Green Spaces in the Omnidirectional Field of Vision Using Omnidirectional Cameras and Smartphones in Urban Environments"), Chapter 5.1.2 ("Transformation to Lambert Cylindrical Equal-area Projection"), 2 pages, Jan. 25, 2016.

Second Office Action for Japanese Application No. 2019-533268 dated Dec. 15, 2020; 2 pgs.

Wakasa, Kazuki, "Proposal of a Method for Measuring the Ratio of Visible Green Spaces in the Omnidirectional Field of Vision Using Omnidirectional Cameras and Smartphobes in Urban Environments," Jan. 25, 2016; 60 pgs.

* cited by examiner

PROJECTION IMAGE CONSTRUCTION METHOD AND DEVICE

The present application claims priority to Chinese patent application No. 201611187138.2 entitled "Method and Device for Constructing Projection Image" filed with the State Intellectual Property Office of People's Republic of China on Dec. 20, 2016, which is incorporated in the present application by reference in its entirety.

TECHNICAL FIELD

The present application relates to the field of image processing, and more particularly to a method and device for constructing a projection image.

BACKGROUND

In recent years, with the advent of panoramic cameras (such as Google jump, OZO, Eyesir, Teche, Upano and the like) and advanced Virtual Reality (VR) display devices (such as Oculus VR, Samsung Gear VR, HTC vive and the like), a panoramic video has drawn many attention to the technology research and development and product content innovation, and is widely used in various fields such as VR cinemas, panoramic games, panoramic education, panoramic medical care, panoramic tourism and the like.

In order to clearly show local view contents in a player to be watched by a user, it usually needs to shoot a panoramic video with more than 4K ultra-high resolution. An ultra-high resolution video with more than 4K resolution (more than 3840 px*1920 px) has massive amount of pixels, which brings a big data challenge to storage, compression, transmission, decoding and rendering of the panoramic video. For the big data challenge, how to reduce the resolution and bit rate of the panoramic video has become one of the key issues that must be resolved for the panoramic video.

SUMMARY OF THE INVENTION

In order to solve the technical problems mentioned above, embodiments of the present application provide a method and device for constructing a projection image to reduce the resolution and bit rate of a panoramic image or video. The technical solutions will be described hereafter.

A method for constructing a projection image, comprising:

performing projection on an equirectangular panoramic image with a cylindrical surface equal-area projection model to obtain a cylindrical surface equal-area projection image;

obtaining a two-dimensional coordinate of each of pixels in the cylindrical surface equal-area projection image;

performing coordinate transformation on the obtained two-dimensional coordinate of each of pixels in the cylindrical surface equal-area projection image to obtain a two-dimensional coordinate in the equirectangular panoramic image corresponding to each of pixels in the cylindrical surface equal-area projection image;

performing pixel interpolation on the cylindrical surface equal-area projection image, based on color information of each of pixels in the equirectangular panoramic image and the obtained two-dimensional coordinate in the equirectangular panoramic image corresponding to each of pixels in the cylindrical surface equal-area projection image, to generate a panoramic image subjected to the cylindrical surface equal-area projection transformation.

Optionally, performing coordinate transformation on the obtained two-dimensional coordinate of each of pixels in the cylindrical surface equal-area projection image to obtain a two-dimensional coordinate in the equirectangular panoramic image corresponding to each of pixels in the cylindrical surface equal-area projection image, comprises:

performing the coordinate transformation, by using a formula $$\begin{cases} x = ((2*u/(n-1)-1)*\pi+\pi)*(n-1)/(2*\pi) \\ y = (m-1) - \arcsin((1-2*v/(m-1))+\pi/2)*(m-1)/\pi \end{cases},$$

on the obtained two-dimensional coordinate of each of pixels in the cylindrical surface equal-area projection image to obtain a two-dimensional coordinate in the equirectangular panoramic image corresponding to each of pixels in the cylindrical surface equal-area projection image;

wherein, x denotes an abscissa of a two-dimensional coordinate of a pixel in the equirectangular panoramic image, y denotes an ordinate of the two-dimensional coordinate of the pixel in the equirectangular panoramic image, u denotes an abscissa of the pixel in the cylindrical surface equal-area projection image, v denotes an ordinate of the pixel in the cylindrical surface equal-area projection image, in and n denote a height and a width of the equirectangular panoramic image, respectively, and π is the PI.

Optionally, performing pixel interpolation on the cylindrical surface equal-area projection image, based on color information of each of pixels in the equirectangular panoramic image and the obtained two-dimensional coordinate in the equirectangular panoramic image corresponding to each of pixels in the cylindrical surface equal-area projection image, to generate a panoramic image subjected to the cylindrical surface equal-area projection transformation, comprises:

performing the pixel interpolation on the cylindrical surface equal-area projection image, by using a bilinear interpolation algorithm, based on the color information of each of pixels in the equirectangular panoramic image and the obtained two-dimensional coordinate in the equirectangular panoramic image corresponding to each of pixels in the cylindrical surface equal-area projection image, to generate the panoramic image subjected to the cylindrical surface equal-area projection transformation.

Optionally, performing pixel interpolation on the cylindrical surface equal-area projection image, based on color information of each of pixels in the equirectangular panoramic image and the obtained two-dimensional coordinate in the equirectangular panoramic image corresponding to each of pixels in the cylindrical surface equal-area projection image, to generate a panoramic image subjected to the cylindrical surface equal-area projection transformation, comprises:

performing the pixel interpolation on the cylindrical surface equal-area projection image, by using a spline interpolation algorithm, based on the color information of each of pixels in the equirectangular panoramic image and the obtained two-dimensional coordinate in the equirectangular panoramic image corresponding to each of pixels in the cylindrical surface equal-area projection image, to generate the panoramic image subjected to the cylindrical surface equal-area projection transformation.

A device for constructing a projection image comprises:

a projection module used to perform projection on an equirectangular panoramic image with a cylindrical surface equal-area projection model, to obtain a cylindrical surface equal-area projection image;

a first obtaining module used to obtain a two-dimensional coordinate of each of pixels in the cylindrical surface equal-area projection image;

a transformation module used to perform coordinate transformation on the obtained two-dimensional coordinate of each of pixels in the cylindrical surface equal-area projection image to obtain two-dimensional coordinate in the equirectangular panoramic image corresponding to each of pixels in the cylindrical surface equal-area projection image;

a first generation module used to perform pixel interpolation on the cylindrical surface equal-area projection image, based on color information of each of pixels in the equirectangular panoramic image and the obtained two-dimensional coordinate in the equirectangular panoramic image corresponding to each of pixels in the cylindrical surface equal-area projection image, to generate a panoramic image subjected to the cylindrical surface equal-area projection transformation.

Optionally, the transformation module comprises:

a transformation unit, used to perform the coordinate transformation, by using the formula $$\begin{cases} x = ((2*u/(n-1)-1)*\pi+\pi)*(n-1)/(2*\pi) \\ y = (m-1) - \arcsin((1-2*v/(m-1))+\pi/2)*(m-1)/\pi \end{cases},$$

on the obtained two-dimensional coordinate of each of pixels in the cylindrical surface equal-area projection image to obtain a two-dimensional coordinate in the equirectangular panoramic image corresponding to each of pixels in the cylindrical surface equal-area projection image;

wherein, x denotes an abscissa of a two-dimensional coordinate of a pixel in the equirectangular panoramic image, y denotes an ordinate of the two-dimensional coordinate of the pixel in the equirectangular panoramic image, u denotes an abscissa of the pixel in the cylindrical surface equal-area projection image, v denotes an ordinate of the pixel in the cylindrical surface equal-area projection image, in and n denote the height and width of the equirectangular panoramic image, respectively, and π denotes the PI.

Optionally, the first generation module comprises:

a first generation unit used to perform the pixel interpolation on the cylindrical surface equal-area projection image, by using a bilinear interpolation algorithm, based on the color information of each of pixels in the equirectangular panoramic image and the obtained two-dimensional coordinate in the equirectangular panoramic image corresponding to each of pixels in the cylindrical surface equal-area projection image, to generate the panoramic image subjected to the cylindrical surface equal-area projection transformation.

Optionally, the first generation module comprises:

a second generation unit used to perform the pixel interpolation on the cylindrical surface equal-area projection image, by using a spline interpolation algorithm, based on the color information of each of pixels in the equirectangular panoramic image and the obtained two-dimensional coordinate in the equirectangular panoramic image corresponding to each of pixels in the cylindrical surface equal-area projection image, to generate the panoramic image subjected to the cylindrical surface equal-area projection transformation.

An electronic device comprises a processor, a communication interface, a memory and a communication bus, wherein the processor, the communication interface and the memory communicate with each other via the communication bus;

the memory is used to store a computer program;

the processor is used to, when the program stored in the memory is executed, implement steps of the method for constructing a projection image according to embodiments of the present application. The method for constructing a projection image comprises:

performing projection on an equirectangular panoramic image with a cylindrical surface equal-area projection model to obtain a cylindrical surface equal-area projection image;

obtaining a two-dimensional coordinate of each of pixels in the cylindrical surface equal-area projection image;

performing coordinate transformation on the obtained two-dimensional coordinate of each of pixels in the cylindrical surface equal-area projection image to obtain a two-dimensional coordinate in the equirectangular panoramic image corresponding to each of pixels in the cylindrical surface equal-area projection image;

performing pixel interpolation on the cylindrical surface equal-area projection image, based on color information of each of pixels in the equirectangular panoramic image and the obtained two-dimensional coordinate in the equirectangular panoramic image corresponding to each of pixels in the cylindrical surface equal-area projection image, to generate a panoramic image subjected to the cylindrical surface equal-area projection transformation.

A computer-readable storage medium stores a computer program thereon which, when executed by a processor, cause the processor to implement steps of the method for constructing a projection image according to the embodiments of the present application. The method for constructing a projection image comprises:

performing projection on an equirectangular panoramic image with a cylindrical surface equal-area projection model to obtain a cylindrical surface equal-area projection image;

obtaining a two-dimensional coordinate of each of pixels in the cylindrical surface equal-area projection image;

performing coordinate transformation on the two-dimensional coordinate of each of pixels in the cylindrical surface equal-area projection image to obtain a two-dimensional coordinate in the equirectangular panoramic image corresponding to each of pixels in the cylindrical surface equal-area projection image;

performing pixel interpolation on the cylindrical surface equal-area projection image, based on color information of each of pixels in the equirectangular panoramic image and the obtained two-dimensional coordinate in the equirectangular panoramic image corresponding to each of pixels in the cylindrical surface equal-area projection image, to generate a panoramic image subjected to the cylindrical surface equal-area projection transformation.

Compared with the prior art, there are following advantages in the present application.

An equirectangular panoramic image as a storage format for a panoramic image or panoramic video currently causes a higher resolution and larger bit rate of the panoramic image or panoramic video, since for the same texture of the equirectangular panoramic image, the area occupied thereof near the pole is larger than the area occupied thereof near the equator. In the present application, in order to reduce the resolution and bit rate of the panoramic image or panoramic video, the panoramic image subjected to the cylindrical surface equal-area projection transformation instead of the equirectangular panoramic image is used as the storage format for the panoramic image or panoramic video.

The resolution and bit rate of the panoramic image or video can be reduced by using the panoramic image subjected to the cylindrical surface equal-area projection transformation as the storage format for the panoramic image or panoramic video, for the reason that: the projecting of an equirectangular panoramic image with a cylindrical surface equal-area projection model ensures that there is no deformation or small deformation for the textures near the equator, and thus ensures the definition of the panoramic image or panoramic video; and comparing to the equirectangular panoramic image, textures at two poles in the cylindrical surface equal-area projection image obtained through projection are further compressed in the y-axis direction, which ensures that the area of textures at the two poles and the area of textures near the equator are the same. Therefore, the resolution and bit rate of the panoramic image or the panoramic video can be reduced by the panoramic image subjected to the cylindrical surface equal-area projection transformation obtained after the pixel interpolation.

BRIEF DESCRIPTION OF THE DRAWINGS

In order to explain the technical solutions of embodiments of the present application, a simple introduction of the drawings required in the description of the embodiments will be given. Apparently, the drawings in the following description show merely some embodiments of the present application, and a person of ordinary skill in the art may derive other drawings from these drawings without creative efforts.

FIG. 4 (*a*) illustrates a coordinate system of the equirectangular panoramic image, FIG. 4 (*b*) illustrates a spherical coordinate system of a spherical panoramic image represented with latitude and longitude;

DETAILED DESCRIPTION OF THE INVENTION

The technical solution of embodiments of the present application will be described clearly and completely below with reference to the drawings in the embodiments of the present application. Obviously, the embodiments described are merely some embodiments instead of all the embodiments of the present application. All other embodiments obtained by those of ordinary skill in the art based on the embodiments of the present application without any creative efforts are within the scope of the present application.

The First Embodiment

Figure 1:
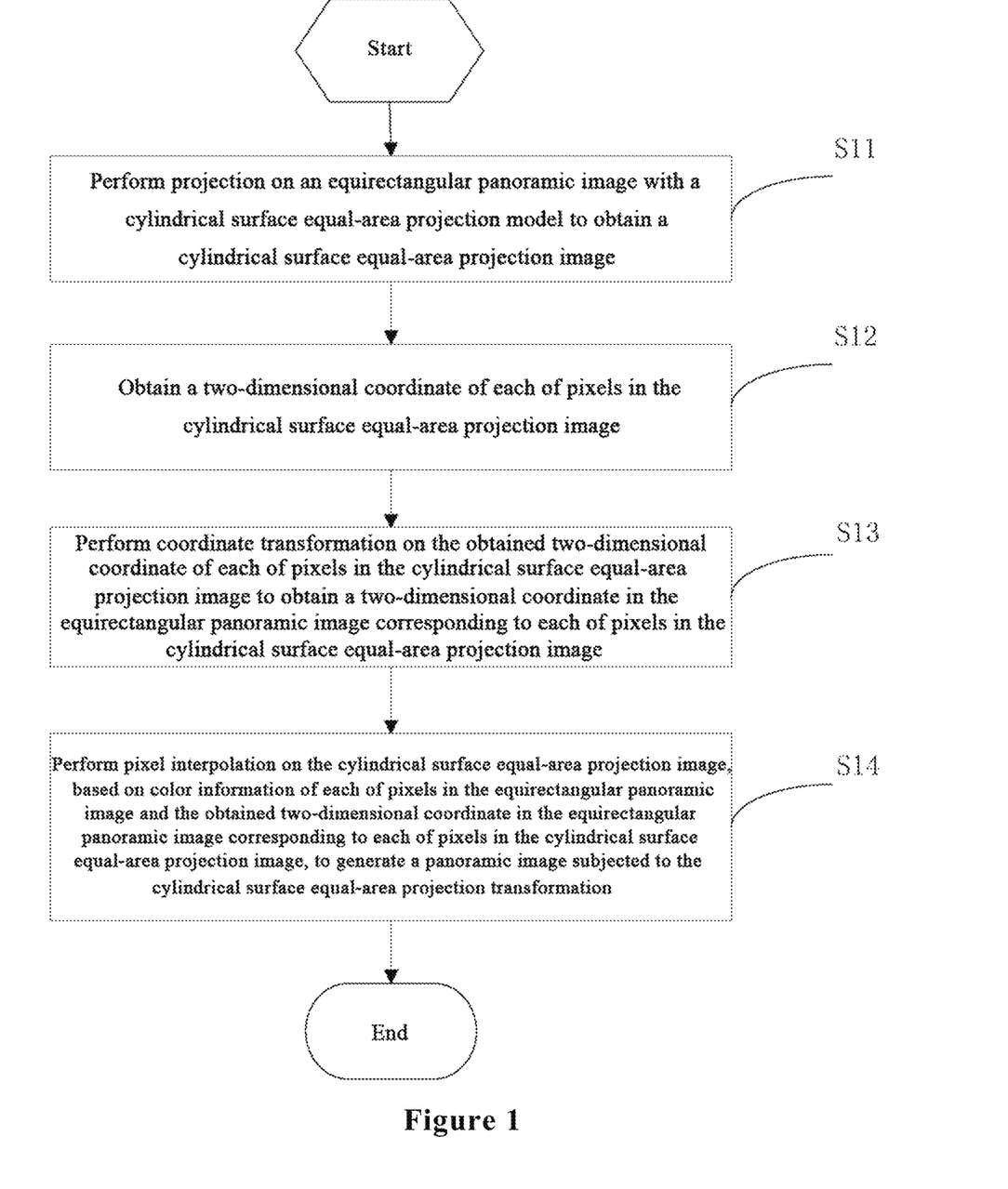
FIG. 1 is a flow diagram of a method for constructing a projection image according to the present application.

FIG. 1 illustrates a flow diagram of a method for constructing a projection image according to the present application, and the method may comprise the following steps S11-S14.

In step S11, projection is performed on an equirectangular panoramic image with a cylindrical surface equal-area projection model to obtain a cylindrical surface equal-area projection image.

The equirectangular panoramic image is a storage format for a spherical panoramic image, i.e. panoramic image or panoramic video. The correspondence between the equirectangular panoramic image and the spherical panoramic image is:

$$\begin{cases} x = \lambda \\ y = \varphi \end{cases}.$$

$(\lambda,\varphi)$ denotes a spherical coordinate of the spherical panoramic image, and (x,y) denotes an image coordinate of the equirectangular panoramic image.

Figure 2:
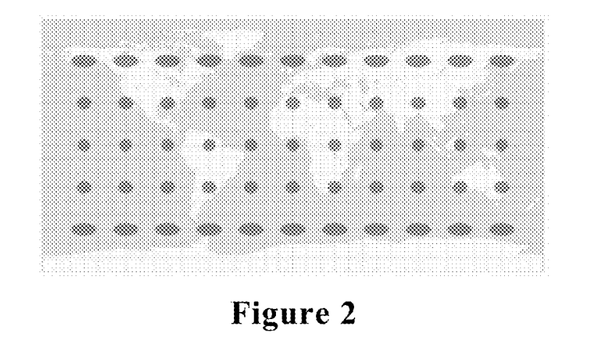
FIG. 2 is a schematic diagram of an equirectangular panoramic image according to the present application.

FIG. 2 shows the equirectangular panoramic image obtained when a spherical panoramic image is stored in a format of the equirectangular panoramic image. As shown in FIG. 2, the deformation law of the equirectangular panoramic image is that circles at two poles are horizontally stretched into ellipses, that is, the sampling of the equirectangular causes that the textures near the poles are stretched horizontally. That is, for the same texture, the area occupied thereof near the pole is larger than the area occupied thereof near the equator. The deformation law of the equirectangular panoramic image, as shown in FIG. 2, results in a high resolution and larger bit rate of the spherical panoramic image (i.e., panoramic image or panoramic video).

In order to reduce and correct the deformation at the poles, and thereby reduce the resolution and bit rate of the spherical panoramic image (i.e., panoramic image or panoramic video), the projection is performed on the equirectangular panoramic image with a cylindrical surface equal-area projection model in the embodiment.

The principle that the resolution and bit rate of the spherical panoramic image (i.e., panoramic image or panoramic video) can be reduced by performing the projection on the equirectangular panoramic image with the cylindrical surface equal-area projection model is as follows.

Figure 3:
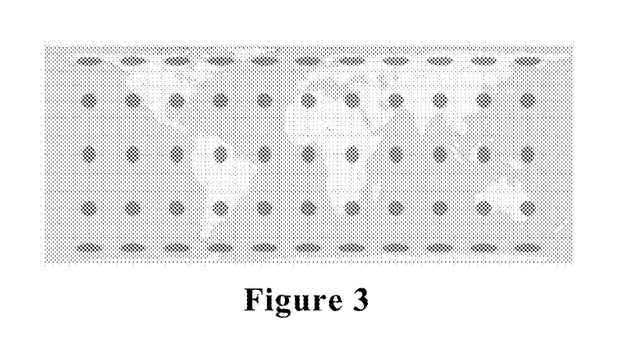
FIG. 3 is a schematic diagram of a cylindrical surface equal-area projection image according to the present application.

FIG. 3 shows the cylindrical surface equal-area projection image obtained by performing projection on an equirectangular panoramic image with a cylindrical surface equal-area projection model. As shown in FIG. 3, the deformation law of the cylindrical surface equal-area projection image is that circles at the two poles in the equirectangular panoramic image are further compressed in the y-axis direction. The deformation law of the cylindrical surface equal-area projection image ensures the uniformity of the two-dimensional sampling (spherical radian sampling) in the spherical panoramic image, such that the area of a circle at the poles is the same as the area of a circle in the center of the equator. Thus, the resolution and bit rate of the spherical panoramic image (i.e., panoramic image or panoramic video) are reduced.

Specifically, performing of projection on an equirectangular panoramic image with a cylindrical surface equal-area projection model is:

performing the projection on the equirectangular panoramic image with a cylindrical surface equal-area projection formula $$\begin{cases} x = \lambda \cos\varphi_0 \\ y = \dfrac{\sin\varphi}{\cos\varphi_0} \end{cases}.$$

In the formula $$\begin{cases} x = \lambda \cos\varphi_0 \\ y = \dfrac{\sin\varphi}{\cos\varphi_0} \end{cases},$$

x denotes an abscissa of the cylindrical surface equal-area projection image, y denotes an ordinate of the cylindrical surface equal-area projection image, λ denotes an abscissa of a spherical coordinate in the spherical panoramic image, φ denotes an ordinate of the spherical coordinate in the spherical panoramic image, and $\varphi_0$ denotes a input parameter for specifying an aspect ratio of the cylindrical surface equal-area projection image.

Since the aspect ratio of the cylindrical surface equal-area projection image can be changed by setting the value of $\varphi_0$, thus the size of the cylindrical surface equal-area projection image can be customized.

In this step, there is a two-dimensional coordinate of each of the pixels in the cylindrical surface equal-area projection image obtained through projection, but there is no pixel value for each of the pixels.

In step S12, a two-dimensional coordinate of each of pixels in the cylindrical surface equal-area projection image is obtained.

After the cylindrical surface equal-area projection image is obtained, it is necessary to fill the cylindrical surface equal-area projection image with pixels, to obtain a complete panoramic image subjected to the cylindrical surface equal-area projection transformation. In order to fill the cylindrical surface equal-area projection image with pixels, it is firstly necessary to transform the coordinate system of the cylindrical surface equal-area projection image into the coordinate system of the equirectangular panoramic image, thereby the pixel value corresponding to each coordinate in the cylindrical surface equal-area projection image can be found in the original spherical panoramic image corresponding to the equirectangular panoramic image. The specific process comprise steps S12-S14.

In step S13, coordinate transformation is performed on the obtained two-dimensional coordinate of each of pixels in the cylindrical surface equal-area projection image to obtain a two-dimensional coordinate in the equirectangular panoramic image corresponding to each of pixels in the cylindrical surface equal-area projection image.

In step S14, pixel interpolation is performed on the cylindrical surface equal-area projection image, based on color information of each of pixels in the equirectangular panoramic image and the obtained two-dimensional coordinate in the equirectangular panoramic image corresponding to each of pixels in the cylindrical surface equal-area projection image, to generate a panoramic image subjected to the cylindrical surface equal-area projection transformation.

An equirectangular panoramic image as a storage format for a panoramic image or panoramic video currently causes a higher resolution and larger bit rate of the panoramic image or panoramic video, since for the same texture of the equirectangular panoramic image, the area occupied thereof near the pole is larger than the area occupied thereof near the equator. In the present application, in order to reduce the resolution and bit rate of the panoramic image or panoramic video, the panoramic image subjected to the cylindrical surface equal-area projection transformation instead of the equirectangular panoramic image is used as the storage format for the panoramic image or panoramic video.

The resolution and bit rate of the panoramic image or video can be reduced by using the panoramic image subjected to the cylindrical surface equal-area projection transformation as the storage format for the panoramic image or panoramic video, for the reason that: the projecting of an equirectangular panoramic image with a cylindrical surface equal-area projection model ensures that there is no deformation or small deformation for the textures near the equator, and thus ensures the definition of the panoramic image or panoramic video; and comparing to the equirectangular panoramic image, textures at two poles in the cylindrical surface equal-area projection image obtained through projection are further compressed in the y-axis direction, which ensures that the area of textures at the two poles and the area of textures near the equator are the same. Therefore, the resolution and bit rate of the panoramic image or the panoramic video can be reduced by the panoramic image subjected to the cylindrical surface equal-area projection transformation obtained after the pixel interpolation.

Textures at the two poles are further compressed in the y-axis direction by performing projection on the equirectangular panoramic image with the cylindrical surface equal-area projection model. This leads to a decline in the definition of the image near the poles, but in most cases, the attention is focused on a region near the equator in the panoramic image or panoramic video. Thus, in many applications, the reducing of the definition of the image near the poles has a less effect on the displaying effect.

In the present application, a process of performing coordinate transformation on the obtained two-dimensional coordinate of each of pixels in the cylindrical surface equal-area projection image to obtain a two-dimensional coordinate in the equirectangular panoramic image corresponding to each of pixels in the cylindrical surface equal-area projection image, specifically comprises:

performing the coordinate transformation, by using a formula $$\begin{cases} x = ((2*u/(n-1)-1)*\pi+\pi)*(n-1)/(2*\pi) \\ y = (m-1)-\arcsin((1-2*v/(m-1))+\pi/2)*(m-1)/\pi \end{cases},$$

on the obtained two-dimensional coordinate of each of pixels in the cylindrical surface equal-area projection image to obtain a two-dimensional coordinate in the equirectangular panoramic image corresponding to each of pixels in the cylindrical surface equal-area projection image.

In the formula $$\begin{cases} x = ((2*u/(n-1)-1)*\pi+\pi)*(n-1)/(2*\pi) \\ y = (m-1)-\arcsin((1-2*v/(m-1))+\pi/2)*(m-1)/\pi \end{cases},$$

x denotes an abscissa of a two-dimensional coordinate of a pixel in the equirectangular panoramic image, y denotes an ordinate of the two-dimensional coordinate of the pixel in the equirectangular panoramic image, u denotes an abscissa of the pixel in the cylindrical surface equal-area projection image, v denotes an ordinate of the pixel in the cylindrical surface equal-area projection image, m and n denote a height and a width of the equirectangular panoramic image, respectively, and π denotes the PI.

A process of generating the formula $$\begin{cases} x = ((2*u/(n-1)-1)*\pi+\pi)*(n-1)/(2*\pi) \\ y = (m-1) - \arcsin((1-2*v/(m-1))+\pi/2)*(m-1)/\pi \end{cases},$$

specifically comprise:
obtaining the formula $$\begin{cases} x = \lambda\cos\varphi_0 \\ y = \dfrac{\sin\varphi}{\cos\varphi_0} \end{cases}$$

for projecting the spherical panoramic image to the cylindrical surface equal-area projection image, wherein in the formula $$\begin{cases} x = \lambda\cos\varphi_0 \\ y = \dfrac{\sin\varphi}{\cos\varphi_0} \end{cases},$$

x denotes the abscissa of the cylindrical surface equal-area projection image, y denotes the ordinate of the cylindrical surface equal-area projection image, $\lambda$ denotes an abscissa of a spherical coordinate of the spherical panoramic image, $\varphi$ denotes an ordinate of the spherical coordinate of the spherical panoramic image, and $\varphi_0$ denotes a input parameter for specifying an aspect ratio of the cylindrical surface equal-area projection image;
obtaining a coordinate transformation relationship $$(x, y) \to (\lambda, \varphi) = \left(\dfrac{2\pi y}{n-1} - \pi, \dfrac{\pi}{2} - \dfrac{\pi x}{m-1}\right)$$

from the equirectangular panoramic image to the spherical panoramic image, wherein in $$(x, y) \to (\lambda, \varphi) = \left(\dfrac{2\pi y}{n-1} - \pi, \dfrac{\pi}{2} - \dfrac{\pi x}{m-1}\right),$$

m and n denote respectively the height and width of the equirectangular panoramic image, x denotes the abscissa of a pixel in the equirectangular panoramic image, y denotes the ordinate of the pixel in the equirectangular panoramic image.

Figure 4:
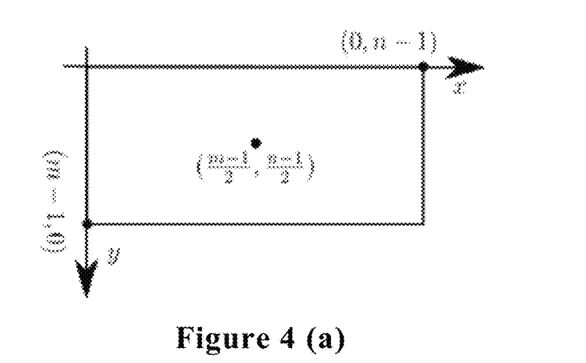

The coordinate transformation relationship from the equirectangular panoramic image to the spherical panoramic image can be seen in the FIG. 4(a) and FIG. 4(b). FIG. 4(a) illustrates the coordinate system of the equirectangular panoramic image, and FIG. 4(b) illustrates the spherical coordinate system of the spherical panoramic image represented with latitude and longitude.

The formula $$\begin{cases} x = ((2*u/(n-1)-1)*\pi+\pi)*(n-1)/(2*\pi) \\ y = (m-1) - \arcsin((1-2*v/(m-1))+\pi/2)*(m-1)/\pi \end{cases}$$

is obtained by combining mathematically the formula $$\begin{cases} x = \lambda\cos\varphi_0 \\ y = \dfrac{\sin\varphi}{\cos\varphi_0} \end{cases}$$

for projecting the spherical panoramic image to the cylindrical surface equal-area projection image and the coordinate transformation relationship $$(x, y) \to (\lambda, \varphi) = \left(\dfrac{2\pi y}{n-1} - \pi, \dfrac{\pi}{2} - \dfrac{\pi x}{m-1}\right)$$

from the equirectangular panoramic image to the spherical panoramic image.

The process of performing pixel interpolation on the cylindrical surface equal-area projection image, based on color information of each of pixels in the equirectangular panoramic image and the obtained two-dimensional coordinate in the equirectangular panoramic image corresponding to each of pixels in the cylindrical surface equal-area projection image, to generate a panoramic image subjected to the cylindrical surface equal-area projection transformation, specifically comprises:
performing the pixel interpolation on the cylindrical surface equal-area projection image, by using an interpolation algorithm (which may be any existing interpolation algorithms, such as a bilinear interpolation algorithm or a spline interpolation algorithm), based on the color information of each of pixels in the equirectangular panoramic image and the obtained two-dimensional coordinate in the equirectangular panoramic image corresponding to each of pixels in the cylindrical surface equal-area projection image, to generate the panoramic image subjected to the cylindrical surface equal-area projection transformation.

Specifically, performing pixel interpolation on the cylindrical surface equal-area projection image, by using the bilinear interpolation algorithm, to generate the panoramic image subjected to the cylindrical surface equal-area projection transformation, may comprise: inputting the color information of each of pixels in the equirectangular panoramic image and the obtained two-dimensional coordinate in the equirectangular panoramic image corresponding to each of pixels in the cylindrical surface equal-area projection image to a bilinear interpolation model, to obtain a pixel value of each of pixels in the panoramic image subjected to the cylindrical surface equal-area projection transformation, which is output by the bilinear interpolation model.

The bilinear interpolation model is a model created by the bilinear interpolation algorithm.

Performing pixel interpolation on the cylindrical surface equal-area projection image, by using the spline interpolation algorithm, to generate the panoramic image subjected to the cylindrical surface equal-area projection transformation, may comprise: inputting the color information of each of pixels in the equirectangular panoramic image and the obtained two-dimensional coordinate in the equirectangular panoramic image corresponding to each of pixels in the cylindrical surface equal-area projection image to a spline interpolation model, to obtain the pixel value of each of pixels in the panoramic image subjected to the cylindrical surface equal-area projection transformation, which is output by the spline interpolation model.

The spline interpolation model is a model created by the spline interpolation algorithm.

The embodiments described above will be described with reference to specific examples.

Step 1: performing projection on an equirectangular panoramic image with a cylindrical surface equal-area projection model to obtain a cylindrical surface equal-area projection image.

For example, the width w and the height h of the cylindrical surface equal-area projection image can be set in advance.

In this step, there is the two-dimensional coordinate u and v of each of the pixels in the cylindrical surface equal-area projection image obtained through the projection, but there is no pixel value for each of the pixels.

Step 2: obtaining the two-dimensional coordinate (u, v) of each of pixels in the cylindrical surface equal-area projection image.

Step 3: performing coordinate transformation on the obtained two-dimensional coordinate of each of pixels in the cylindrical surface equal-area projection image to obtain a two-dimensional coordinate in the equirectangular panoramic image corresponding to each of pixels in the cylindrical surface equal-area projection image, specifically comprises the process:

performing the coordinate transformation, by using the formula $$\begin{cases} x = ((2*u/(n-1)-1)*\pi+\pi)*(n-1)/(2*\pi) \\ y = (m-1) - \arcsin((1-2*v/(m-1))+\pi/2)*(m-1)/\pi \end{cases},$$

on the obtained two-dimensional coordinate of each of pixels in the cylindrical surface equal-area projection image to obtain a two-dimensional coordinate in the equirectangular panoramic image corresponding to each of pixels in the cylindrical surface equal-area projection image, wherein, x denotes an abscissa of a two-dimensional coordinate of a pixel in the equirectangular panoramic image, y denotes an ordinate of the two-dimensional coordinate of the pixel in the equirectangular panoramic image, u denotes an abscissa of the pixel in the cylindrical surface equal-area projection image, v denotes the an ordinate of the pixel in the cylindrical surface equal-area projection image, in and n denote a height and a width of the equirectangular panoramic image, respectively, and π denotes the PI. A value of u is in a range from 0 to w−1, i.e., [0, w−1], and a value of v is in a range from 0 to h−1, i.e., [0, h−1]. w denotes the width of the cylindrical surface equal-area projection image, and h denotes the height of the cylindrical surface equal-area projection image.

The process of generating the formula $$\begin{cases} x = ((2*u/(n-1)-1)*\pi+\pi)*(n-1)/(2*\pi) \\ y = (m-1) - \arcsin((1-2*v/(m-1))+\pi/2)*(m-1)/\pi \end{cases},$$

specifically comprise:

obtaining a formula $$\begin{cases} u = \lambda \cos\varphi_0 \\ v = \dfrac{\sin\varphi}{\cos\varphi_0} \end{cases}$$

for projecting the spherical panoramic image to the cylindrical surface equal-area projection image, wherein in the formula $$\begin{cases} u = \lambda \cos\varphi_0 \\ v = \dfrac{\sin\varphi}{\cos\varphi_0} \end{cases},$$

u denotes the abscissa of the cylindrical surface equal-area projection image, v denotes the ordinate of the cylindrical surface equal-area projection image, λ denotes an abscissa of a spherical coordinate in the spherical panoramic image, φ denotes an ordinate of the spherical coordinate in the spherical panoramic image, and $\varphi_0$ denotes an input parameter for specifying an aspect ratio of the cylindrical surface equal-area projection image;

obtaining a coordinate transformation relationship $$(x, y) \to (\lambda, \varphi) = \left(\dfrac{2\pi y}{n-1} - \pi, \dfrac{\pi}{2} - \dfrac{\pi x}{m-1}\right)$$

from the equirectangular panoramic image to the spherical panoramic image, wherein in $$(x, y) \to (\lambda, \varphi) = \left(\dfrac{2\pi y}{n-1} - \pi, \dfrac{\pi}{2} - \dfrac{\pi x}{m-1}\right),$$

m and n denote respectively the height and width of the equirectangular panoramic image, x denotes the abscissa of a pixel in the equirectangular panoramic image, and y denotes the ordinate of the pixel in the equirectangular panoramic image.

The coordinate transformation relationship from the equirectangular panoramic image to the spherical panoramic image can be seen in the FIG. 4(a) and FIG. 4(b). FIG. 4(a) illustrates the coordinate system of the equirectangular panoramic image, and FIG. 4(b) illustrates the spherical coordinate system of the spherical panoramic image represented with latitude and longitude.

The transformation formula $$\begin{cases} x = ((2*u/(n-1)-1)*\pi+\pi)*(n-1)/(2*\pi) \\ y = (m-1) - \arcsin((1-2*v/(m-1))+\pi/2)*(m-1)/\pi \end{cases}$$

between the equirectangular panoramic image and the cylindrical surface equal-area projection image is obtained by combining mathematically the formula $$\begin{cases} u = \lambda \cos\varphi_0 \\ v = \dfrac{\sin\varphi}{\cos\varphi_0} \end{cases}$$

for projecting the spherical panoramic image to the cylindrical surface equal-area projection image and the coordinate transformation relationship $$(x, y) \rightarrow (\lambda, \varphi) = \left( \frac{2\pi y}{n-1} - \pi, \frac{\pi}{2} - \frac{\pi x}{m-1} \right)$$

from the equirectangular panoramic image to the spherical panoramic image.

Step 4: performing pixel interpolation on the cylindrical surface equal-area projection image, based on color information of each of pixels in the equirectangular panoramic image and the obtained two-dimensional coordinate in the equirectangular panoramic image corresponding to each of pixels in the cylindrical surface equal-area projection image, to generate a panoramic image subjected to the cylindrical surface equal-area projection transformation.

The Second Embodiment

Figure 5:
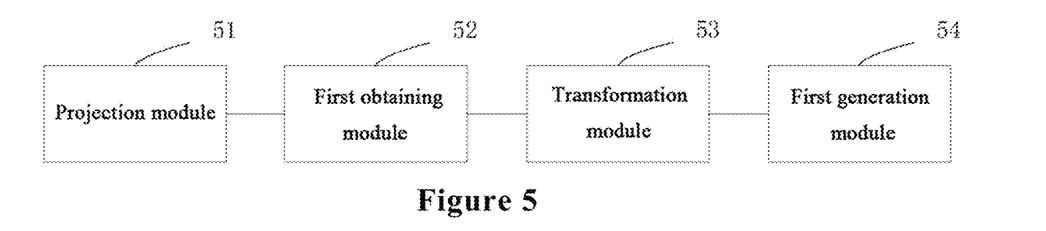
FIG. 5 is a schematic diagram of a logical structure of a device for constructing a projection image according to the present application.

In accordance with the embodiment of the method described above, this embodiment provides a device for constructing a projection image, as shown in FIG. 5. The device for constructing a projection image comprises: a projection module 51, a first obtaining module 52, a transformation module 53, and a first generation module 54.

The projection module 51 is used to preform projection on an equirectangular panoramic image by using a cylindrical surface equal-area projection model to obtain a cylindrical surface equal-area projection image.

The first obtaining module 52 is used to obtain a two-dimensional coordinate of each of pixels in the cylindrical surface equal-area projection image.

The transformation module 53 is used to perform coordinate transformation on the obtained two-dimensional coordinate of each of pixels in the cylindrical surface equal-area projection image to obtain a two-dimensional coordinate in the equirectangular panoramic image corresponding to each of pixels in the cylindrical surface equal-area projection image.

The first generation module 54 is used to perform pixel interpolation on the cylindrical surface equal-area projection image, based on color information of each of pixels in the equirectangular panoramic image and the obtained two-dimensional coordinate in the equirectangular panoramic image corresponding to each of pixels in the cylindrical surface equal-area projection image, to generate a panoramic image subjected to the cylindrical surface equal-area projection transformation.

In the embodiment, the transformation module 53 specifically comprises: a transformation unit, which is used to perform the coordinate transformation, by using the formula $$\begin{cases} x = ((2*u/(n-1)-1)*\pi+\pi)*(n-1)/(2*\pi) \\ y = (m-1) - \arcsin((1-2*v/(m-1))+\pi/2)*(m-1)/\pi \end{cases},$$

on the obtained two-dimensional coordinate of each of pixels in the cylindrical surface equal-area projection image to obtain the two-dimensional coordinate in the equirectangular panoramic image corresponding to each of pixels in the cylindrical surface equal-area projection image;

wherein, x denotes an abscissa of a two-dimensional coordinate of a pixel in the equirectangular panoramic image, y denotes an ordinate of the two-dimensional coordinate of the pixel in the equirectangular panoramic image, u denotes an abscissa of the pixel in the cylindrical surface equal-area projection image, v denotes an ordinate of the pixel in the cylindrical surface equal-area projection image, m and n denote a height and a width of the equirectangular panoramic image, respectively, and π denotes the PI.

In the embodiment, the device for constructing a projection image further comprises: a second obtaining module, a third obtaining module and a second generation module.

The second obtaining module, the third obtaining module and the second generation module are used to generate the formula $$\begin{cases} x = ((2*u/(n-1)-1)*\pi+\pi)*(n-1)/(2*\pi) \\ y = (m-1) - \arcsin((1-2*v/(m-1))+\pi/2)*(m-1)/\pi \end{cases}.$$

The second obtaining module is used to obtain a formula $$\begin{cases} x = \lambda \cos\varphi_0 \\ y = \dfrac{\sin\varphi}{\cos\varphi_0} \end{cases}$$

for projecting the spherical panoramic image to the cylindrical surface equal-area projection image, wherein x denotes the abscissa of the cylindrical surface equal-area projection image, y denotes the ordinate of the cylindrical surface equal-area projection image, λ denotes an abscissa of the spherical coordinate in the spherical panoramic image, φ denotes an ordinate of the spherical coordinate in the spherical panoramic image, and $\varphi_0$ denotes an input parameter for specifying an aspect ratio of the cylindrical surface equal-area projection image.

The third obtaining module is used to obtain a coordinate transformation relationship $$(x, y) \rightarrow (\lambda, \varphi) = \left( \frac{2\pi y}{n-1} - \pi, \frac{\pi}{2} - \frac{\pi x}{m-1} \right)$$

from the equirectangular panoramic image to the spherical panoramic image, wherein m and n denote respectively the height and width of the equirectangular panoramic image, x denotes the abscissa of a pixel in the equirectangular panoramic image, and y denotes the ordinate of the pixel in the equirectangular panoramic image.

The second generation module is used to obtain the formula $$\begin{cases} x = ((2*u/(n-1)-1)*\pi+\pi)*(n-1)/(2*\pi) \\ y = (m-1) - \arcsin((1-2*v/(m-1))+\pi/2)*(m-1)/\pi \end{cases}$$

by combining mathematically the formula $$\begin{cases} x = \lambda \cos\varphi_0 \\ y = \dfrac{\sin\varphi}{\cos\varphi_0} \end{cases}$$

for projecting the spherical panoramic image to the cylindrical surface equal-area projection image and the coordinate transformation relationship $$(x, y) \to (\lambda, \varphi) = \left(\frac{2\pi y}{n-1} - \pi, \frac{\pi}{2} - \frac{\pi x}{m-1}\right)$$

from the equirectangular panoramic image to the spherical panoramic image.

In the embodiment, the first generation module 54 may specifically comprise a first generation unit or a second generation unit.

The first generation unit is configure to perform the pixel interpolation on the cylindrical surface equal-area projection image, by using a bilinear interpolation algorithm, based on the color information of each of pixels in the equirectangular panoramic image and the obtained two-dimensional coordinate in the equirectangular panoramic image corresponding to each of pixels in the cylindrical surface equal-area projection image, to generate the panoramic image subjected to the cylindrical surface equal-area projection transformation.

The second generation unit is used to perform the pixel interpolation on the cylindrical surface equal-area projection image, by using a spline interpolation algorithm, based on the color information of each of pixels in the equirectangular panoramic image and the obtained two-dimensional coordinate in the equirectangular panoramic image corresponding to each of pixels in the cylindrical surface equal-area projection image, to generate the panoramic image subjected to the cylindrical surface equal-area projection transformation.

In another implementation of the above embodiment, the device for constructing a projection image further comprises: a second obtaining module, a third obtaining module and a second generation module.

The second obtaining module, the third obtaining module and the second generation module are used to generate the formula $$\begin{cases} x = ((2*u/(n-1)-1)*\pi+\pi)*(n-1)/(2*\pi) \\ y = (m-1) - \arcsin((1-2*v/(m-1))+\pi/2)*(m-1)/\pi \end{cases}.$$

The second obtaining module is used to obtain a formula $$\begin{cases} u = \lambda\cos\varphi_0 \\ v = \dfrac{\sin\varphi}{\cos\varphi_0} \end{cases}$$

for projecting the spherical panoramic image to the cylindrical surface equal-area projection image, wherein u denotes the abscissa of the cylindrical surface equal-area projection image, v denotes the ordinate of the cylindrical surface equal-area projection image, λ denotes an abscissa of a spherical coordinate in the spherical panoramic image, φ denotes an ordinate of the spherical coordinate in the spherical panoramic image, and $\varphi_0$ denotes an input parameter for specifying an aspect ratio of the cylindrical surface equal-area projection image. A value of u is in a range from 0 to w−1, i.e., [0, w−1], and a value of v is in a range from 0 to h−1, i.e., [0, h−1]. w denotes the width of the cylindrical surface equal-area projection image, and h denotes the height of the cylindrical surface equal-area projection image.

The third obtaining module is used to obtain a coordinate transformation relationship $$(x, y) \to (\lambda, \varphi) = \left(\frac{2\pi y}{n-1} - \pi, \frac{\pi}{2} - \frac{\pi x}{m-1}\right)$$

from the equirectangular panoramic image to the spherical panoramic image, wherein in and n denote respectively the height and width of the equirectangular panoramic image, x denotes the abscissa of a pixel in the equirectangular panoramic image, and y denotes the ordinate of the pixel in the equirectangular panoramic image.

The second generation module is used to obtain the formula $$\begin{cases} x = ((2*u/(n-1)-1)*\pi+\pi)*(n-1)/(2*\pi) \\ y = (m-1) - \arcsin((1-2*v/(m-1))+\pi/2)*(m-1)/\pi \end{cases}$$

by combining mathematically the formula $$\begin{cases} u = \lambda\cos\varphi_0 \\ v = \dfrac{\sin\varphi}{\cos\varphi_0} \end{cases}$$

for projecting the spherical panoramic image to the cylindrical surface equal-area projection image and the coordinate transformation relationship $$(x, y) \to (\lambda, \varphi) = \left(\frac{2\pi y}{n-1} - \pi, \frac{\pi}{2} - \frac{\pi x}{m-1}\right)$$

from the equirectangular panoramic image to the spherical panoramic image.

The Third Embodiment

In accordance with the embodiments of methods described above, the embodiment provides an electronic device comprising a processor, a communication interface, a memory and a communication bus, wherein the processor, the communication interface, and the memory communicate with each other via the communication bus.

The memory is used to store a computer program.

The processor is used to, when the program stored on the memory are executed, implement the method for constructing a projection image according to embodiments of the present application. The method for constructing a projection image comprises:

performing projection on an equirectangular panoramic image with a cylindrical surface equal-area projection model to obtain a cylindrical surface equal-area projection image;

obtaining a two-dimensional coordinate of each of pixels in the cylindrical surface equal-area projection image;

performing coordinate transformation on the obtained two-dimensional coordinate of each of pixels in the cylindrical surface equal-area projection image to obtain a two-dimensional coordinate in the equirectangular panoramic image corresponding to each of pixels in the cylindrical surface equal-area projection image;

performing pixel interpolation on the cylindrical surface equal-area projection image, based on color information of each of pixels in the equirectangular panoramic image and the obtained two-dimensional coordinate in the equirectangular panoramic image corresponding to each of pixels in the cylindrical surface equal-area projection image, to generate a panoramic image subjected to the cylindrical surface equal-area projection transformation.

An equirectangular panoramic image as a storage format for a panoramic image or panoramic video currently causes a higher resolution and larger bit rate of the panoramic image or panoramic video, since for the same texture of the equirectangular panoramic image, the area occupied thereof near the pole is larger than the area occupied thereof near the equator. In the present application, in order to reduce the resolution and bit rate of the panoramic image or panoramic video, the panoramic image subjected to the cylindrical surface equal-area projection transformation instead of the equirectangular panoramic image is used as the storage format for the panoramic image or panoramic video.

The resolution and bit rate of the panoramic image or video can be reduced by using the panoramic image subjected to the cylindrical surface equal-area projection transformation as the storage format for the panoramic image or panoramic video, for the reason that: the projecting of an equirectangular panoramic image with a cylindrical surface equal-area projection model ensures that there is no deformation or small deformation for the textures near the equator, and thus ensures the definition of the panoramic image or panoramic video; and comparing to the equirectangular panoramic image, textures at two poles in the cylindrical surface equal-area projection image obtained through projection are further compressed in the y-axis direction, which ensures that the area of textures at the two poles and the area of textures near the equator are the same. Therefore, the resolution and bit rate of the panoramic image or the panoramic video can be reduced by the panoramic image subjected to the cylindrical surface equal-area projection transformation obtained after the pixel interpolation.

The Second Embodiment

In accordance with the embodiments of methods described above, this embodiment provides a computer-readable storage medium stores a computer program thereon which, when executed by a processor, cause the processor to implement the method for constructing a projection image according to the embodiments of the present application. The method for constructing a projection image comprises:

performing projection on an equirectangular panoramic image with a cylindrical surface equal-area projection model to obtain a cylindrical surface equal-area projection image;

obtaining a two-dimensional coordinate of each of pixels in the cylindrical surface equal-area projection image;

performing coordinate transformation on the obtained two-dimensional coordinate of each of pixels in the cylindrical surface equal-area projection image to obtain a two-dimensional coordinate in the equirectangular panoramic image corresponding to each of pixels in the cylindrical surface equal-area projection image;

performing pixel interpolation on the cylindrical surface equal-area projection image, based on color information of each of pixels in the equirectangular panoramic image and the obtained two-dimensional coordinate in the equirectangular panoramic image corresponding to each of pixels in the cylindrical surface equal-area projection image, to generate a panoramic image subjected to the cylindrical surface equal-area projection transformation.

An equirectangular panoramic image as a storage format for a panoramic image or panoramic video currently causes a higher resolution and larger bit rate of the panoramic image or panoramic video, since for the same texture of the equirectangular panoramic image, the area occupied thereof near the pole is larger than the area occupied thereof near the equator. In the present application, in order to reduce the resolution and bit rate of the panoramic image or panoramic video, the panoramic image subjected to the cylindrical surface equal-area projection transformation instead of the equirectangular panoramic image is used as the storage format for the panoramic image or panoramic video.

The resolution and bit rate of the panoramic image or panoramic video can be reduced by using the panoramic image subjected to the cylindrical surface equal-area projection transformation as the storage format for the panoramic image or panoramic video, for the reason that: the projecting of an equirectangular panoramic image with a cylindrical surface equal-area projection model ensures that there is no deformation or small deformation for the textures near the equator, and thus ensures the definition of the panoramic image or panoramic video; and comparing to the equirectangular panoramic image, textures at two poles in the cylindrical surface equal-area projection image obtained through projection are further compressed in the y-axis direction, which ensures that the area of textures at the two poles and the area of textures near the equator are the same. Therefore, the resolution and bit rate of the panoramic image or the panoramic video can be reduced by the panoramic image subjected to the cylindrical surface equal-area projection transformation obtained after the pixel interpolation.

It should be noted that various embodiments herein adopt corresponding ways for description. The same or similar parts in various embodiments can be referred to one another, and each embodiment is focused on the differences from other embodiments. For embodiments of a device, since they are similar to embodiments of the method, the description thereof is relatively simple. The relating parts could refer to the parts of the description of embodiments of the method.

It should be noted that, the relationship terms herein such as "first", "second" and the like are only used for distinguishing one entity or operation from another entity or operation, but do not necessarily require or imply that there is actual relationship or order between these entities or operations. Moreover, the terms "include", "comprise" or any other variants thereof are intended to cover a non-exclusive inclusion, so that a process, method, article, or device comprising a series of elements comprise not only those elements listed but also those not specifically listed or the elements intrinsic to the process, method, article, or device. Without further limitations, an element defined by a sentence "comprise(s) a . . . " or "include(s) a . . . " do not exclude that there are other identical elements in the process, method, article, or device which comprises these elements.

The method and device for constructing a projection image provided by the present application has been described in detail herein. The principle and embodiments of the present application have been described with reference to particular examples. The description of the embodiments above is merely for assisting in understanding the method of the present application and the core concept thereof. It will be apparent to those skilled in the art that there may be changes in the embodiments and the scope of application in accordance with the teaching of the present application. Therefore, the specification herein should not be construed as limiting the present application.

The invention claimed is:

1. A method for constructing a projection image, comprising:

performing projection of an equirectangular panoramic image with a cylindrical surface equal-area projection model to obtain a cylindrical surface equal-area projection image;

obtaining a two-dimensional coordinate of each of pixels in the cylindrical surface equal-area projection image;

performing coordinate transformation on the obtained two-dimensional coordinate of each of pixels in the cylindrical surface equal-area projection image to obtain a two-dimensional coordinate in the equirectangular panoramic image corresponding to each of pixels in the cylindrical surface equal-area projection image;

performing pixel interpolation on the cylindrical surface equal-area projection image, based on color information of each of pixels in the equirectangular panoramic image and the obtained two-dimensional coordinate in the equirectangular panoramic image corresponding to each of pixels in the cylindrical surface equal-area projection image, to generate a panoramic image subjected to the cylindrical surface equal-area projection transformation.

2. The method of claim 1, wherein performing coordinate transformation on the two-dimensional coordinate of each of pixels in the cylindrical surface equal-area projection image to obtain a two-dimensional coordinate in the equirectangular panoramic image corresponding to each of pixels in the cylindrical surface equal-area projection image, comprises:

performing the coordinate transformation, by using a formula $$\begin{cases} x = ((2*u/(n-1)-1)*\pi+\pi)*(n-1)/(2*\pi) \\ y = (m-1) - \arcsin((1-2*v/(m-1))+\pi/2)*(m-1)/\pi \end{cases},$$

on the obtained two-dimensional coordinate of each of pixels in the cylindrical surface equal-area projection image to obtain the two-dimensional coordinate in the equirectangular panoramic image corresponding to each of pixels in the cylindrical surface equal-area projection image;

wherein, x denotes an abscissa of a two-dimensional coordinate of a pixel in the equirectangular panoramic image, y denotes an ordinate of the two-dimensional coordinate of the pixel in the equirectangular panoramic image, u denotes an abscissa of the pixel in the cylindrical surface equal-area projection image, v denotes an ordinate of the pixel in the cylindrical surface equal-area projection image, m and n denote a height and a width of the equirectangular panoramic image, respectively, and m>1 and n>1, and π denotes the PI.

3. The method of claim 1, wherein performing pixel interpolation on the cylindrical surface equal-area projection image, based on color information of each of pixels in the equirectangular panoramic image and the obtained two-dimensional coordinate in the equirectangular panoramic image corresponding to each of pixels in the cylindrical surface equal-area projection image, to generate a panoramic image subjected to the cylindrical surface equal-area projection transformation, comprises:

performing the pixel interpolation on the cylindrical surface equal-area projection image, by using a bilinear interpolation algorithm, based on the color information of each of pixels in the equirectangular panoramic image and the obtained two-dimensional coordinate in the equirectangular panoramic image corresponding to each of pixels in the cylindrical surface equal-area projection image, to generate the panoramic image subjected to the cylindrical surface equal-area projection transformation.

4. The method of claim 1, wherein performing pixel interpolation on the cylindrical surface equal-area projection image, based on color information of each of pixels in the equirectangular panoramic image and the obtained two-dimensional coordinate in the equirectangular panoramic image corresponding to each of pixels in the cylindrical surface equal-area projection image, to generate a panoramic image subjected to the cylindrical surface equal-area projection transformation, comprises:

performing the pixel interpolation on the cylindrical surface equal-area projection image, by using a spline interpolation algorithm, based on the color information of each of pixels in the equirectangular panoramic image and the obtained two-dimensional coordinate in the equirectangular panoramic image corresponding to each of pixels in the cylindrical surface equal-area projection image, to generate the panoramic image subjected to the cylindrical surface equal-area projection transformation.

5. An electronic device comprising a processor and a memory, wherein the memory is used to store a computer program;

the processor is used to, when executing the computer program stored on the memory, implement steps of the method for constructing a projection image, wherein the method comprises:

performing projection of an equirectangular panoramic image with a cylindrical surface equal-area projection model to obtain a cylindrical surface equal-area projection image;

obtaining a two-dimensional coordinate of each of pixels in the cylindrical surface equal-area projection image;

performing coordinate transformation on the obtained two-dimensional coordinate of each of pixels in the cylindrical surface equal-area projection image to obtain a two-dimensional coordinate in the equirectangular panoramic image corresponding to each of pixels in the cylindrical surface equal-area projection image;

performing pixel interpolation on the cylindrical surface equal-area projection image, based on color information of each of pixels in the equirectangular panoramic image and the obtained two-dimensional coordinate in the equirectangular panoramic image corresponding to each of pixels in the cylindrical surface equal-area projection image, to generate a panoramic image subjected to the cylindrical surface equal-area projection transformation.

6. The electronic device of claim 5, wherein performing coordinate transformation on the two-dimensional coordinate of each of pixels in the cylindrical surface equal-area projection image to obtain a two-dimensional coordinate in the equirectangular panoramic image corresponding to each of pixels in the cylindrical surface equal-area projection image, comprises:

performing the coordinate transformation, by using a formula $$\begin{cases} x = ((2*u/(n-1)-1)*\pi+\pi)*(n-1)/(2*\pi) \\ y = (m-1) - \arcsin((1-2*v/(m-1))+\pi/2)*(m-1)/\pi \end{cases},$$

on the obtained two-dimensional coordinate of each of pixels in the cylindrical surface equal-area projection image to obtain the two-dimensional coordinate in the equirectangular panoramic image corresponding to each of pixels in the cylindrical surface equal-area projection image;

wherein, x denotes an abscissa of a two-dimensional coordinate of a pixel in the equirectangular panoramic image, y denotes an ordinate of the two-dimensional coordinate of the pixel in the equirectangular panoramic image, u denotes an abscissa of the pixel in the cylindrical surface equal-area projection image, v denotes an ordinate of the pixel in the cylindrical surface equal-area projection image, m and n denote a height and a width of the equirectangular panoramic image, respectively, and m>1 and n>1, and π denotes the PI.

7. The electronic device of claim 5, wherein performing pixel interpolation on the cylindrical surface equal-area projection image, based on color information of each of pixels in the equirectangular panoramic image and the obtained two-dimensional coordinate in the equirectangular panoramic image corresponding to each of pixels in the cylindrical surface equal-area projection image, to generate a panoramic image subjected to the cylindrical surface equal-area projection transformation, comprises:

performing the pixel interpolation on the cylindrical surface equal-area projection image, by using a bilinear interpolation algorithm, based on the color information of each of pixels in the equirectangular panoramic image and the obtained two-dimensional coordinate in the equirectangular panoramic image corresponding to each of pixels in the cylindrical surface equal-area projection image, to generate the panoramic image subjected to the cylindrical surface equal-area projection transformation.

8. The electronic device of claim 5, wherein performing pixel interpolation on the cylindrical surface equal-area projection image, based on color information of each of pixels in the equirectangular panoramic image and the obtained two-dimensional coordinate in the equirectangular panoramic image corresponding to each of pixels in the cylindrical surface equal-area projection image, to generate a panoramic image subjected to the cylindrical surface equal-area projection transformation, comprises:

performing the pixel interpolation on the cylindrical surface equal-area projection image, by using a spline interpolation algorithm, based on the color information of each of pixels in the equirectangular panoramic image and the obtained two-dimensional coordinate in the equirectangular panoramic image corresponding to each of pixels in the cylindrical surface equal-area projection image, to generate the panoramic image subjected to the cylindrical surface equal-area projection transformation.

9. A non-transitory computer-readable storage medium, wherein the non-transitory computer-readable storage medium stores a computer program thereon which, when being executed by a processor, causes the processor to implement steps of the method for constructing a projection image, wherein the method comprises:
performing projection of an equirectangular panoramic image with a cylindrical surface equal-area projection model to obtain a cylindrical surface equal-area projection image;
obtaining a two-dimensional coordinate of each of pixels in the cylindrical surface equal-area projection image;
performing coordinate transformation on the obtained two-dimensional coordinate of each of pixels in the cylindrical surface equal-area projection image to obtain a two-dimensional coordinate in the equirectangular panoramic image corresponding to each of pixels in the cylindrical surface equal-area projection image;
performing pixel interpolation on the cylindrical surface equal-area projection image, based on color information of each of pixels in the equirectangular panoramic image and the obtained two-dimensional coordinate in the equirectangular panoramic image corresponding to each of pixels in the cylindrical surface equal-area projection image, to generate a panoramic image subjected to the cylindrical surface equal-area projection transformation.

10. The non-transitory computer-readable storage medium of claim 9, wherein performing coordinate transformation on the two-dimensional coordinate of each of pixels in the cylindrical surface equal-area projection image to obtain a two-dimensional coordinate in the equirectangular panoramic image corresponding to each of pixels in the cylindrical surface equal-area projection image, comprises:

performing the coordinate transformation, by using a formula $$\begin{cases} x = ((2*u/(n-1)-1)*\pi+\pi)*(n-1)/(2*\pi) \\ y = (m-1) - \arcsin((1-2*v/(m-1))+\pi/2)*(m-1)/\pi \end{cases},$$

on the obtained two-dimensional coordinate of each of pixels in the cylindrical surface equal-area projection image to obtain the two-dimensional coordinate in the equirectangular panoramic image corresponding to each of pixels in the cylindrical surface equal-area projection image;

wherein, x denotes an abscissa of a two-dimensional coordinate of a pixel in the equirectangular panoramic image, y denotes an ordinate of the two-dimensional coordinate of the pixel in the equirectangular panoramic image, u denotes an abscissa of the pixel in the cylindrical surface equal-area projection image, v denotes an ordinate of the pixel in the cylindrical surface equal-area projection image, m and n denote a height and a width of the equirectangular panoramic image, respectively, and m>1 and n>1, and π denotes the PI.

11. The non-transitory computer-readable storage medium of claim 9, wherein performing pixel interpolation on the cylindrical surface equal-area projection image, based on color information of each of pixels in the equirectangular panoramic image and the obtained two-dimensional coordinate in the equirectangular panoramic image corresponding to each of pixels in the cylindrical surface equal-area projection image, to generate a panoramic image subjected to the cylindrical surface equal-area projection transformation, comprises:

performing the pixel interpolation on the cylindrical surface equal-area projection image, by using a bilinear interpolation algorithm, based on the color information of each of pixels in the equirectangular panoramic image and the obtained two-dimensional coordinate in the equirectangular panoramic image corresponding to each of pixels in the cylindrical surface equal-area projection image, to generate the panoramic image subjected to the cylindrical surface equal-area projection transformation.

12. The non-transitory computer-readable storage medium of claim 9, wherein performing pixel interpolation on the cylindrical surface equal-area projection image, based on color information of each of pixels in the equirectangular panoramic image and the obtained two-dimensional coordinate in the equirectangular panoramic image corresponding to each of pixels in the cylindrical surface equal-area projection image, to generate a panoramic image subjected to the cylindrical surface equal-area projection transformation, comprises:
  performing the pixel interpolation on the cylindrical surface equal-area projection image, by using a spline interpolation algorithm, based on the color information of each of pixels in the equirectangular panoramic image and the obtained two-dimensional coordinate in the equirectangular panoramic image corresponding to each of pixels in the cylindrical surface equal-area projection image, to generate the panoramic image subjected to the cylindrical surface equal-area projection transformation.

* * * * *